June 10, 1930.                H. R. KLINGNER                1,762,721
                                GAS CONNECTION
                             Filed Feb. 17, 1928
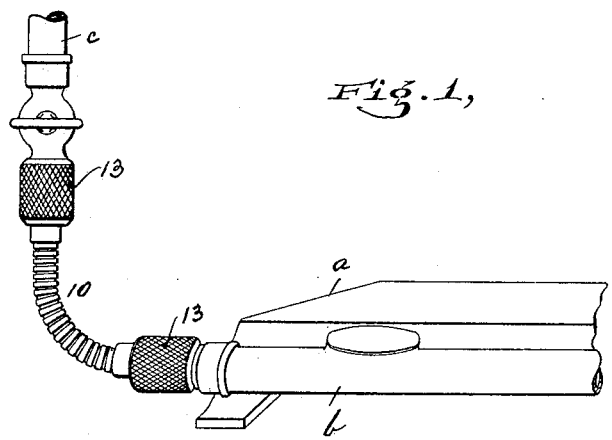
Fig. 1,
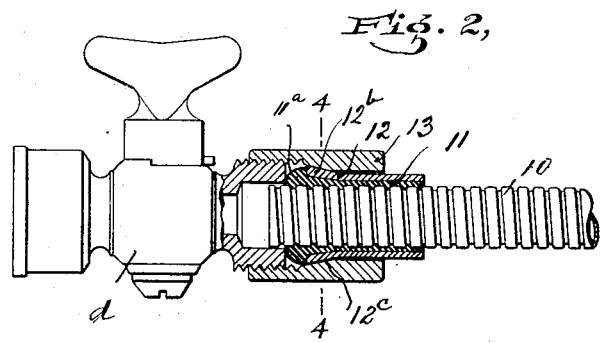
Fig. 2,
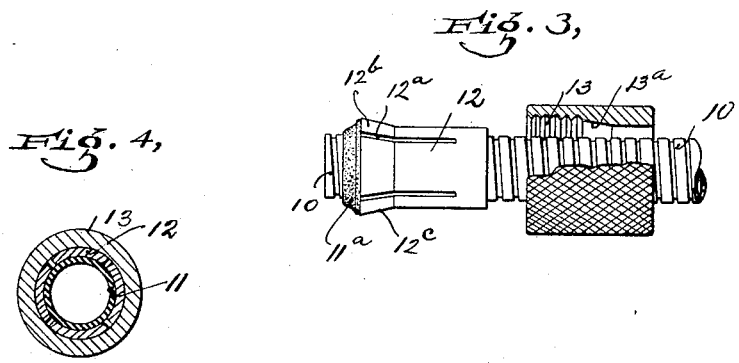
Fig. 3,
Fig. 4,
                                    INVENTOR
                              Hermann Richard Klingner
                                      BY
                                           ATTORNEY Patented June 10, 1930

1,762,721

UNITED STATES PATENT OFFICE

HERMANN RICHARD KLINGNER, OF DRESDEN, GERMANY, ASSIGNOR TO ALFRED WAGNER, OF NEW YORK, N. Y.

GAS CONNECTION

Application filed February 17, 1928. Serial No. 255,098.

This invention relates to removable connection between two fluid conducting pipes, particularly between a gas supply pipe and the gas distributing pipe of a gas range or the like.

The hitherto used connections for this purpose have the drawback that they easily slacken permitting the escape of the fluid and thereby entailing waste, and in case of gas spreading offensive gas smell and often causing gas poisoning.

To obviate this drawback is the object of this invention which I accomplish by providing a removable connection that can be quickly and easily applied to the pipes to produce perfectly tight joints.

With this and other objects in view my invention consists in the novel construction, combination and arrangement of parts as will be hereinafter more fully described and defined in the appended claim.

In the accompanying drawing which forms part of this specification and in which similar reference characters denote corresponding parts, Fig. 1 is a perspective view of a gas range connected to the gas supply pipe by my new device; Fig. 2 is a longitudinal section of the device; Fig. 3 an elevational view of one end thereof with the muff in inoperative position and Fig. 4 a cross section thereof.

In the present example my device is shown in connection with a gas range. It is clear that without any changes the same may be effectively used for connecting water pipes or the like.

In the drawing $a$ denotes a gas range of conventional construction having fixed to it the gas distributing pipe $b$ communicating with the gas burners (not shown) and $c$ denotes the gas supply pipe. According to this invention the removable connection between said gas supply pipe $c$ and the gas distributing pipe $b$ of the gas range comprises a flexible tube or hose 10 preferably of metal. Tightly fitted on said hose near each end thereof is a rubber sleeve 11 formed at one end with an annular flange $11^a$ adapted to serve as a washer. Mounted around said sleeve 11 is a tubular member 12 of metal or other suitable material which is split longitudinally from one end to an intermediate point thereof as at $12^a$ and at its split end is formed with an annular flange $12^b$ adapted to bear against the rubber washer or flange $11^a$ and whose rear face is tapered as at $12^c$. Slidably mounted on the tube are two muffs 13, one for each end, whose forward parts are internally threaded and adapted to loosely fit over the flanged end of the member 12 and to be threaded to the corresponding pipe. At the rear end of the threaded part of each muff there is a tapered portion $13^a$ which is adapted to cooperate with the tapered portion $12^c$ of the member 12 so as to push the latter forwardly and compress the same as the muff is being threaded on the corresponding pipe. When the member 12 is pushed forwardly it tightens the flanged end $11^a$ of the sleeve 11 against the open end of the pipe and thereby effects a perfectly tight joint.

In use the sleeves 11 and the member 12 are arranged a short distance away from the ends of the tube 10, leaving these ends free to be passed into the openings of the cock $d$ of the gas supply pipe $c$ and of the gas distributing pipe $b$.

The muffs are then shoved over the flanged ends of the clamping members 12 and screwed tightly to the threaded ends of the cock $d$ at one end and the pipe $b$ at the other end.

The compressed members 12 hold the washers $11^a$ tightly in sealing position.

Since various modifications may be made in the construction of my device without departing from the spirit of my invention, I do not wish to restrict myself to the details described and shown.

What I claim is:—

Coupling means for joining together two gas conducting tubes, one of which tubes is provided with a threaded end, and the end of the second of which is adapted to fit into said first named tube, an elastic sleeve, formed at one end with a flange and having a tapered portion, said sleeve being tightly mounted near the said end of said second tube, a split tubular member, provided with a tapered flare at its split end to conform with the tapered portion of said sleeve and adapted to lie thereon, a muff slidably mounted on said second tube provided with threaded means for engaging said threaded end on said first named tube and also provided with an internal tapered portion adapted to bear tightly on said tapered flare, when said muff engages said first named tube, and distort said elastic member longitudinally and transversely to form a leak proof connection between said two tubes.

In testimony whereof I affix my signature.

HERMANN RICHARD KLINGNER.